(12) United States Patent
Ophey et al.

(10) Patent No.: US 7,898,648 B2
(45) Date of Patent: Mar. 1, 2011

(54) OPTICAL IDENTIFIER COMPRISING RANDOMLY ORIENTED PARTIAL FACES

(75) Inventors: Wil Ophey, Eindhoven (NL); Pim Theo Tuyls, Eindhoven (NL); Boris Skoric, Eindhoven (NL); Antonius Hermanus Maria Akkermans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 737 days.

(21) Appl. No.: 11/721,389

(22) PCT Filed: Dec. 12, 2005

(86) PCT No.: PCT/IB2005/054181
§ 371 (c)(1),
(2), (4) Date: Jun. 11, 2007

(87) PCT Pub. No.: WO2006/064448
PCT Pub. Date: Jun. 22, 2006

(65) Prior Publication Data
US 2009/0244518 A1  Oct. 1, 2009

(30) Foreign Application Priority Data

Dec. 17, 2004  (EP) .................................. 04106676

(51) Int. Cl.
*G07D 7/12* (2006.01)
*G06K 9/00* (2006.01)
(52) U.S. Cl. .............. 356/71; 382/93; 382/108; 382/195
(58) Field of Classification Search .............. 356/71, 356/600–601, 630, 636–637; 250/556; 235/454, 235/487, 491; 382/108, 195, 206
See application file for complete search history.

(56) References Cited

U.S. PATENT DOCUMENTS

| 4,677,435 | A |   | 6/1987 | Causse D'Agraives et al. |
|---|---|---|---|---|
| 5,013,971 | A |   | 5/1991 | de La Chapelle |
| 5,101,184 | A | * | 3/1992 | Antes ............................ 235/454 |
| 5,200,794 | A | * | 4/1993 | Nishiguma et al. ............. 356/71 |
| 5,291,006 | A | * | 3/1994 | Nishiguma et al. ........... 235/454 |
| 5,291,027 | A | * | 3/1994 | Kita et al. ...................... 250/566 |
| 5,394,234 | A | * | 2/1995 | Bianco et al. ................... 356/71 |

(Continued)

FOREIGN PATENT DOCUMENTS

EP    1113708 A2    7/2001

(Continued)

OTHER PUBLICATIONS

ISR/Written Opinion of the International Searching Authority PCT/IB2005/053401.

*Primary Examiner* — Sang Nguyen

(57) ABSTRACT

The invention relates to an optical identifier (30) for generating an identification signal in response to an incident radiation beam (12), and to a corresponding method. In order to provide an optical identifier (30) which can be produced by a simplified process and which has nevertheless a sufficient or even improved stability against environmental interferences it is proposed that said identifier comprises a carrier layer (32), at least partially transparent to said radiation beam (12), having a first scattering face (34) comprising a plurality of randomly oriented partial faces for scattering at least a part of said radiation beam (12), wherein said identification signal is formed by a scattered part of said radiation beam (12). Further, a device comprising said identifier, and a reading apparatus for identifying the identifier are proposed.

11 Claims, 4 Drawing Sheets

U.S. PATENT DOCUMENTS

| | | |
|---|---|---|
| 5,619,025 A | 4/1997 | Hickman et al. |
| 5,783,909 A | 7/1998 | Hochstein |
| 5,856,070 A | 1/1999 | Korth |
| 6,061,122 A * | 5/2000 | Hoshino et al. ............... 356/71 |
| 6,285,139 B1 | 9/2001 | Ghanem |
| 6,359,734 B1 * | 3/2002 | Staub et al. ............... 359/572 |
| 6,359,918 B1 | 3/2002 | Bielas |
| 6,466,188 B1 | 10/2002 | Cato |
| 6,584,214 B1 | 6/2003 | Pappu et al. |
| 6,693,394 B1 | 2/2004 | Guo et al. |
| 6,871,788 B2 * | 3/2005 | Tompkin et al. ............ 235/487 |
| 2002/0126889 A1 | 9/2002 | Pikler et al. |
| 2002/0163179 A1 | 11/2002 | Dubner et al. |
| 2003/0063772 A1 | 4/2003 | Smith et al. |
| 2003/0117087 A1 | 6/2003 | Barth et al. |
| 2004/0041526 A1 | 3/2004 | Vollrath |
| 2004/0112962 A1 | 6/2004 | Farrall et al. |
| 2007/0085337 A1 * | 4/2007 | Endres et al. ............... 283/81 |

FOREIGN PATENT DOCUMENTS

| | | |
|---|---|---|
| GB | 2221870 A | 2/1990 |
| GB | 2304077 A | 3/1997 |

* cited by examiner

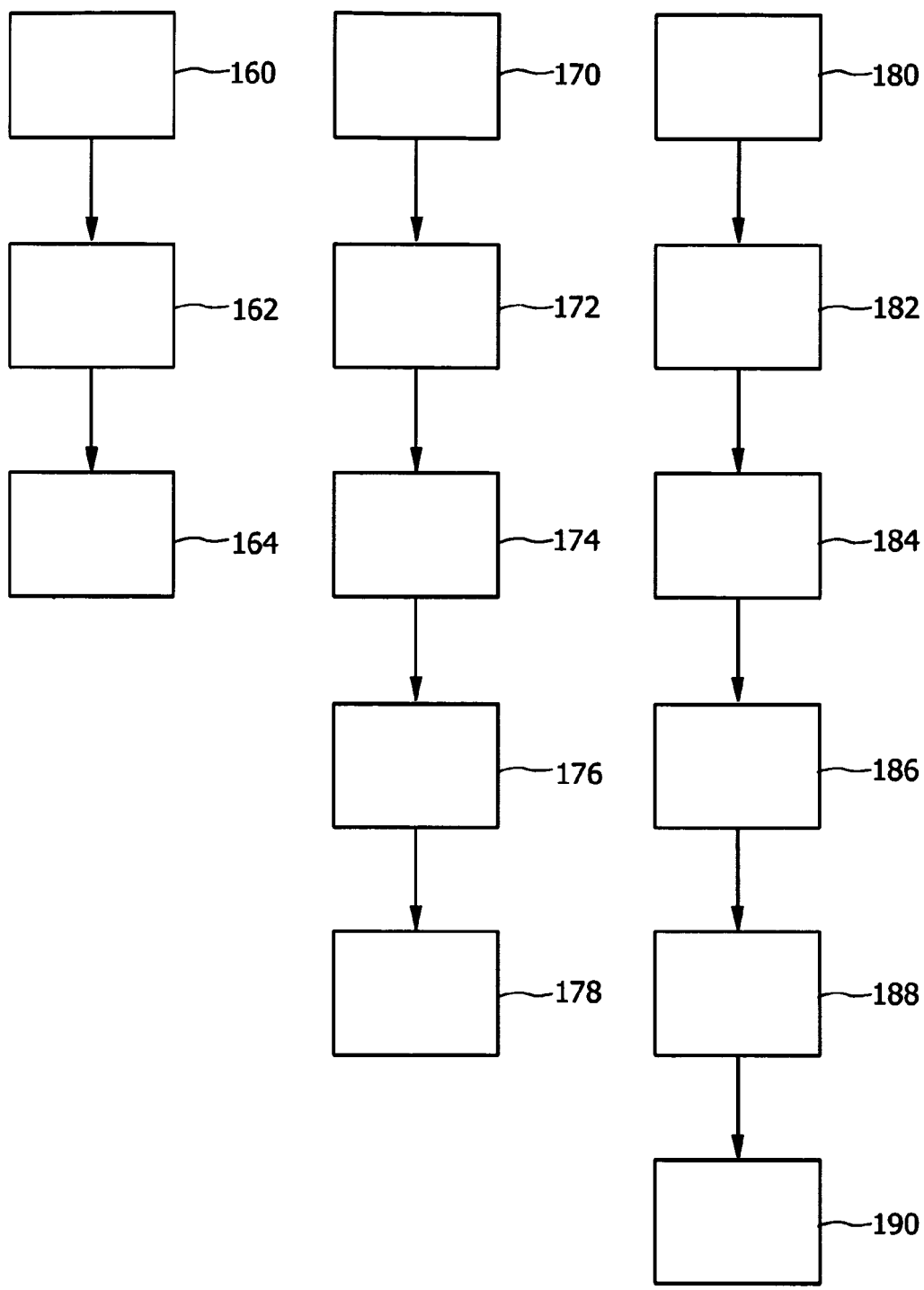

OPTICAL IDENTIFIER COMPRISING RANDOMLY ORIENTED PARTIAL FACES

The invention relates to an optical identifier, in particular a non-clonable optical identifier, for generating an identification signal in response to an incident radiation beam, a device comprising the same, a reading apparatus for identifying the optical identifier and a method for generating an identification signal in response to a radiation beam.

The use of "physically un-clonable functions" (PUFs) for security purposes is known, e.g. from U.S. Pat. No. 6,584,214. Incorporating a PUF into a device such as a smartcard, chip, or storage medium makes it extremely difficult to produce a "clone" of the device. "Clone" means either a physical copy of the device or a model that is capable of predicting the input-output behavior of the device with sufficient reliability. The difficulty of physical copying arises because the PUF manufacturing is an uncontrolled process and the PUF is a highly complex object. Accurate modeling is extremely difficult because of the PUF's complexity; slightly varying the input results in widely diverging outputs. The uniqueness and complexity of PUFs makes them well suited for identification, authentication or key generating purposes.

Known optical PUFs can consist of a piece of, e.g., epoxy containing glass spheres, air-bubbles or any kind of scattering particles. The epoxy can also be replaced by some other transparent means. Generally, PUFs are called identifier hereinafter. Shining radiation, in particular a laser, through a PUF produces a speckle pattern which strongly depends on properties of the incoming wave front and on the internal structure of the PUF. The input (wave front) can be varied by shifting or tilting the incident beam or by changing the focus. Even a slightly changed input may greatly affect the output (speckle pattern). The output may—for example—be detected at a certain distance with a proper reading means, e.g. a CCD or CMOS camera.

The speckle pattern produced at a particular measuring condition (challenge) should be stable in time and under all possible environmental circumstances.

Including glass spheres, air bubbles or other particles for scattering into the identifier may lead to a reduced stability due to, e.g., differing physical properties like thermal expansion. Furthermore, for PUFs made of plastic or the like the demand of stability is hard to satisfy, because of the poor mechanical and temperature stability of this material.

An improved stability in comparison to a plastic PUF is achieved by producing the PUF from glass. The problem with glass PUFs is that particles, which have to be embedded into the glass, have to posses a much higher melting point than the glass. Furthermore, the particles may not dissolve into the glass, which most particle materials do. A known solution to this is to put air bubbles into the glass which is a rather complex process.

All procedures mentioned above need a certain special approach to produce the bulk material of the PUF. A PUF may also be provided with certain coatings to make the device reflective and/or 'slow' to read out.

It is an object of the present invention to provide an optical identifier or optical PUF as described in the opening paragraph which can be produced by a simplified process and which has nevertheless a sufficient or even improved stability against environmental interferences occurring during the use of the identifier. It is a further object to provide a device comprising said identifier, a reading apparatus for identifying the identifier and a corresponding method for generating an identification signal in response to a radiation beam.

The optical identifier according to the present invention, which is preferably a non-clonable optical identifier, comprises a carrier layer being at least partially transparent to said radiation beam, wherein said carrier layer has a first scattering face comprising a plurality of randomly oriented partial faces for scattering at least a part of said radiation beam, wherein said identification signal is formed by a scattered part of said radiation beam, wherein said scattered part of said radiation beam passes said carrier layer.

The invention is based on the insight that an optical identifier with a rough face can be produced easily and can be used for generating a virtually unique identification signal due to the scattering at its partial faces and the randomness of the process used for the production of the partial faces. The partial faces generate a plurality of partial beams during scattering which are combined to form the identification signal after being transmitted through the carrier layer. The carrier layer carries the scattering face. A two-dimensional face is able to scatter an incident radiation beam so that an identification signal can be detected. The generating of the identification signal may be further improved by using a laser radiation as the incident radiation since the coherence of the laser radiation leads to an interference effect during the generation of the identification signal.

It is to be noted that the term "partial faces" refers not only to distinct, rather plane faces which can be distinguished from each other but also to parts of a wavy face. Different partial faces may be or may be not separated by edges.

It is further to be noted that the meaning of the term "random orientations" includes, besides stochastic (or even chaotic) orientations, also predetermined orientations which are so complex or arbitrary that they are virtually stochastic.

In an embodiment of the optical identifier said carrier layer further comprises a reflective face for at least partially reflecting a part of said radiation beam scattered by said first scattering face to said first scattering face. Said reflective face reflects a part of said scattered radiation beam to the scattering face. At the scattering face this reflected part of the beam may be scattered a second time. By reflecting the scattered part of the beam which is used to generate the identification signal said identification signal may be detected on the same side of the identifier from which the radiation is directed, either by a source itself or by a mirror or some other suitable means, to said identifier. This may be advantageous under conditions which do not allow a transmission through the identifier and a detection on the other side.

An example for this is the provision of the identifier on a device or item on which the identifier is attached like a label. A radiation beam impinging onto the rough scattering face is scattered, and a part of the scattered beam is reflected by the reflective face and may be scattered again by the scattering surface producing an identification signal, e.g. a speckle pattern. Depending on the properties of the scattering face a part of the incident beam may also be reflectively scattered. This reflectively scattered part may be combined with the part reflected by the reflective face to form a more complex identification signal. A change of the direction of the impinging beam which may be a laser beam will not only change the two reflected parts of the beam but also shift the two parts of the beam with respect to each other as a function of the angle of incidence. The reflective face may also comprise a plurality of partial faces which may be randomly oriented with respect to each other.

According to a further embodiment of the identifier said carrier layer additionally has a second scattering face comprising a plurality of randomly oriented partial faces for scattering at least a part of said radiation beam. A second scattering face results in an additional scattering leading to a more complex identification signal. The invention is, however, not restricted to only two scattering faces since the identifier may be provided with a plurality of scattering faces.

In a preferred embodiment of the invention said carrier layer is substantially made of glass. Glass has, in comparison to most plastic materials, superior properties, e.g. mechanical properties or properties in regard of the thermal stability.

According to an advantageous embodiment of the invention said first scattering face, said reflective face and/or said second scattering face is a surface of said carrier layer. It is particularly easy to produce a rough surface comprising a plurality of substantially randomly oriented partial faces by, for example, grinding or scratching. If the carrier layer is made of glass there is an additional obstacle for cloning the identifier because, although making a metal stamp of the surface may be possible in principle, glass molding always causes a certain smoothing of the roughness of the surface and thus changes its shape. It is further easy to provide a reflective surface.

The optical identifier according to the invention may comprise a carrier layer which is covered with a protective layer. The protective layer protects the carrier layer against environmental influences. The provision of a protective layer allows the use of a proper material for the carrier layer which may be sensitive or even highly sensitive for, for example, scratches or dust. The protective layer prevents the carrier layer from being changed or damaged. Especially, when a surface of the carrier layer is used as a scattering face or reflective face, said surface has to be protected.

In another embodiment of the present invention the non-clonable optical identifier comprises a semi-transparent coating at an interface between said carrier layer and said protective layer. The semi-transparent coating may be adapted to adjust the amount of radiation which is transmitted through the identifier. Furthermore, if the refractive index of the protective layer and that of the glass are about equal, the amount of scattering at the interface will be rather small. By providing the rough interface with a semi-reflective/semi-transparent coating the amount of scattering can be increased due to the increased reflection by the coating. An increased amount of scattering can be advantageous.

In yet another embodiment of the present invention said semi-reflective/semi-transparent coating is adapted for a part of said incident radiation beam being reflectively scattered by said first scattering face having an intensity substantially equal to the intensity of a part of said radiation bean which passes said carrier layer, is reflected by said reflective face or said second scattering surface and passes said carrier layer again. With a proper tuning of the reflectance and transmission of said coating, the amount of a first reflecting and a transmitting with subsequent reflecting can be tuned in such a way that the identification signal and its angle dependency is improved. If the intensity of the beam reflected at the scattering surface and the intensity of the beam transmitted, reflected and again transmitted are about equal these beams contribute in comparable amounts to the identification signal.

In a further embodiment of the present invention said protective layer is adapted for changing a polarization status of said radiation beam, said layer being in particular birefringent. If the protective layer itself is scratched, thumbed or dusty this may lead to a change in the generated identification signal. If a circular polarizer, in particular a linear polarizer combined with a quarter wave plate, is placed in the path of the impinging radiation beam and of the scattered beam going to the detector only that part of the radiation will be transmitted through the polarizer whose polarization status is properly changed and may be detected by a suitable detector. Said polarizer produces, for example, left handed circular polarized light. At reflection against almost any surface the left handed circular polarized light will be changed into right handed polarized light. This state of polarization will be blocked (absorbed) by the circular polarizer. Thus, the reflectance and hence the scattering due to for instance scratches at a surface can be diminished since there is no change in the polarization status for a part of the incident beam which is reflected or scattered due to such disturbances. A suitable way to achieve this change is to make the protective layer material birefringent. This can be advantageously applied to the reading of optical identifiers in general, and not necessarily only to an optical identifier according to the invention.

The method for generating an identification signal in response to a radiation beam according to the present invention comprises the steps of:

scattering said radiation beam by a scattering face of an optical identifier comprising a plurality of randomly oriented partial faces, transmitting at least a part of said radiation beam through a carrier layer of said optical identifier, forming said identification signal by combining at least a scattered part of said radiation beam.

The incident radiation beam is scattered by the scattering face as a result of, e.g., refraction or diffraction. It has to be noted that by scattering a change of—for example—the direction of a beam or a part of a beam is meant herein which change is substantially random or unpredictable. Scattering may also include a changing of other properties of the radiation like frequency (or wavelength) or polarization. Since the scattering face does not necessarily have to be a surface of the carrier layer the step of transmitting (a part) of the radiation beam may take place before and/or after the step of scattering. The method allows a generation of an identification signal after a transmission of a radiation beam through a carrier layer.

In a further embodiment the method according to the present invention comprises the step of reflecting at least a part of said scattered part of said radiation beam. The step of reflecting allows the detection of the identification signal not only in the general direction of the incident beam but—for example—also on the side of the identifier from which the incident beam came.

In an advantageous embodiment the method according to the invention further comprises the step of reflecting a part of said radiation beam at said scattering face, said identification signal being formed by combining said reflected parts of said radiation beam. Due to the combination of a part of said beam reflected at said scattering face and a part of said beam scattered by said scattering face and reflected afterwards the resulting identification signal is more complex and therefore more difficult to forge. The identification signal detected by the detector is built up of various scattering events. First there is a scattering at the first scattering face. Both the transmitted scattered light and the transmitted refracted light are reflected by a second face and will hit said scattering face again, where it will be partly scattered, partly refracted and partly specular reflected. The transmitted scattered and refracted light will be combined with the previously reflected scattered light at said scattering face. In case a laser or other sufficiently coherent radiation is used the combination includes a coherent interference. The emerging radiation beam will thus have a more or less random amplitude distribution and a random phase distribution and may have a diameter slightly larger than the original impinging radiation beam on the PUF. This emerging light beam diffracts into the space above the identifier and a part of it reaches the detector, where an identification signal, e.g. a speckle pattern, can be observed.

The device comprising an identifier according to the present invention comprises an optical identifier for generating an identification signal in response to an incident radiation beam, said identifier comprising a carrier layer being at least partially transparent to an incident radiation beam, wherein said carrier layer has a first scattering face comprising a plurality of randomly oriented partial faces for scattering at least a part of said radiation beam, wherein said identification signal is formed by a scattered part of said radiation beam, wherein said scattered part of said radiation beam passes said carrier layer, said optical identifier substantially uniquely identifying said device. Said device may particularly be a smartcard, a credit card, an ID card or a data carrier.

The invention further relates to a reading apparatus for identifying an optical identifier for generating an identification signal in response to an incident radiation beam, said identifier comprising a carrier layer being at least partially transparent to said radiation beam, wherein said carrier layer has a first scattering face comprising a plurality of randomly oriented partial faces for scattering at least a part of said radiation beam, wherein said identification signal is formed by a scattered part of said radiation beam, wherein said scattered part of said radiation beam passes said carrier layer, wherein said carrier layer is covered with a protective layer being adapted for changing a polarization status of said radiation beam, in particular being birefringent, said reading apparatus comprising a radiation source for generating said radiation beam, an imaging device for detecting said identification signal and a circular polarizer arranged in the course of said radiation beam and said identification signal. This reading apparatus is adapted for taking advantage of the optical identifier comprising a protective layer which changes a polarization status as commented on above.

In the following, embodiments according to the invention will be explained further in detail with reference to the Figures, in which:

FIGS. 10-12 show diagrams illustrating embodiments of a method for generating an identification signal according to the present invention.

Figure 1:
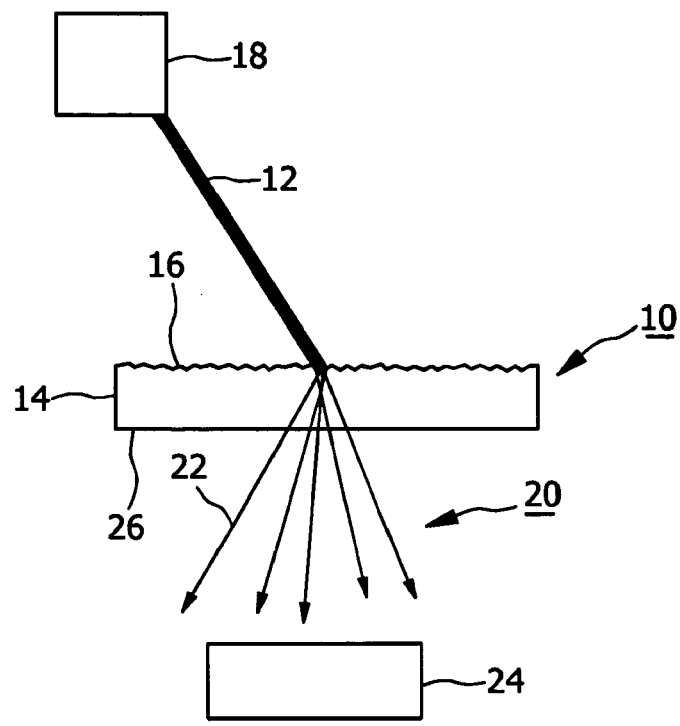
FIG. 1 shows a schematic cross-sectional view of a first embodiment of a non-clonable optical identifier according to the present invention being irradiated by a radiation beam.

FIG. 1 shows a schematic cross-sectional view of a first embodiment of a non-clonable optical identifier 10 according to the present invention being irradiated by a radiation beam 12. The identifier 10 comprises a carrier layer 14 having a scattering face 16 comprising a plurality of randomly oriented partial faces. Said carrier layer 14 is at least partially transparent to said radiation. A preferred material for said carrier layer 14 and the carrier layers described below is glass but other, at least partially transparent materials are also suitable. Said radiation beam 12 is generated by a radiation source 18 and directed to said scattering face 16. Said scattering face 16, namely said plurality of partial faces, scatters said radiation beam 12 generating a scattered part 20 of said beam 12 comprising a plurality of partial beams 22 having randomly oriented directions. Said scattered part 20 passes said carrier layer 14 and exits said identifier 10. Partial beams 22 may be detected by a proper detecting means, for example a camera 24, which is placed at a side of said identifier 10 opposite to said radiation source. The identification signal detected by said camera 24 is formed by said scattered part 20 of said radiation beam 12. It is possible that there is some reflection at said scattering face 16 or at a surface 26 of said carrier layer 14 opposite to said scattering face 16. Further, there may be some refraction of said partial beams 22 at said surface 26. However, the results of the reflections and the change of the directions due the refraction are not shown for the sake of clarity.

Figure 2:
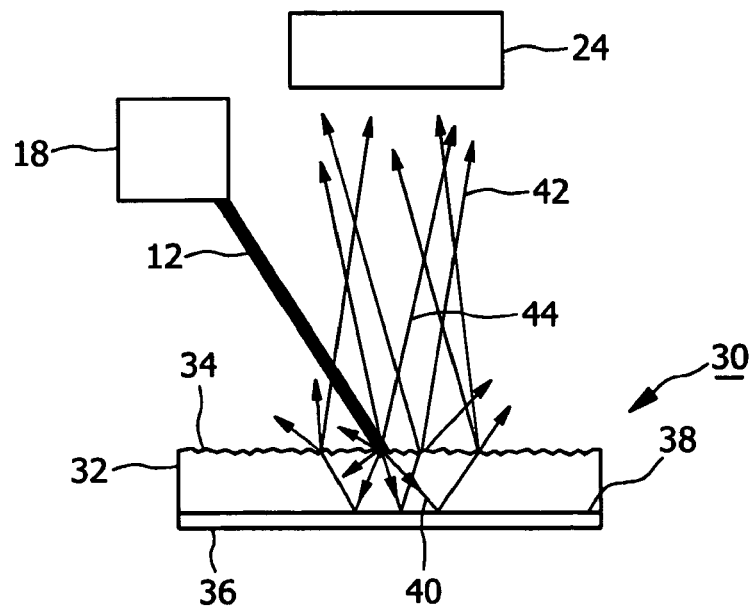
FIG. 2 shows a schematic cross-sectional view of a second embodiment of a non-clonable optical identifier according to the present invention being irradiated by a radiation beam.

FIG. 2 shows a schematic cross-sectional view of a second embodiment of a non-clonable optical identifier 30 according to the present invention being irradiated by a radiation beam 12. The identifier 30 is similar to the identifier 10 shown in FIG. 1 and comprises a carrier layer 32 having a scattering face 34 comprising a plurality of randomly oriented partial faces. Said carrier layer 32 is further provided with a reflective coating 36 on a surface 38 opposite to said scattering face 34. Thus, said carrier comprises a reflective face 38. Said radiation beam 12 is generated by a radiation source 18 and directed to said scattering face 34 where it is partially scattered, wherein some part enters said carrier layer 32 and some part is reflected. Thus, a plurality of scattered partial beams 40 passes through said at least partially transparent carrier layer 32, is reflected at said reflective face 38 to said scattering face 34 and scattered again at said scattering face 34. An identification signal may be detected by a camera 24 which is placed in front of said scattering face 34. Said identification signal is formed by said twice scattered and reflected parts 42 of said radiation beam 12. Some further contribution may be given by parts 44 of said radiation beam 12 which are reflected by said scattering face 34.

Said reflective coating 36 is an Aluminum coating with a thickness of about 100 nm having a reflectance of about 85%, but any other suitable means and thickness values may be used to provide a reflective face. Said reflective face 38 does not have to be a smooth or polished face since the exact direction of the reflection is not important as long a the reflection is directed in general towards a detection means.

Figure 3:
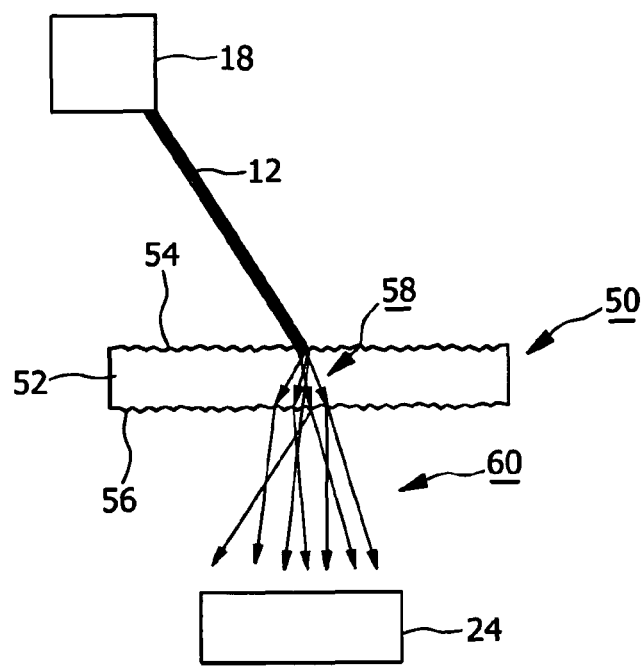
FIG. 3 shows a schematic cross-sectional view of a third embodiment of a non-clonable optical identifier according to the present invention being irradiated by a radiation beam.

FIG. 3 shows a schematic cross-sectional view of a third embodiment of a non-clonable optical identifier 50 according to the present invention being irradiated by a radiation beam 12. Said optical identifier 50 differs from the identifier 10 shown in FIG. 1 in that its carrier layer 52 is provided with a second scattering face 56 in addition to a first scattering face 54. As described above a radiation beam 12 generated by a radiation source 18 impinges on said first scattering face 54 and is scattered. After passing said carrier layer 52 some scattered part 58 of said radiation beam impinges on said second scattering face 56 and is scattered again forming a plurality of scattered partial beams 60 which may be detected by a camera 24 as an identification signal.

Although the faces for scattering and reflecting as shown in the Figures are at the surface of the respective carrier layers it is also possible to use a carrier layer which comprises suitable faces arranged in the inside of said carrier layer.

Figure 4:
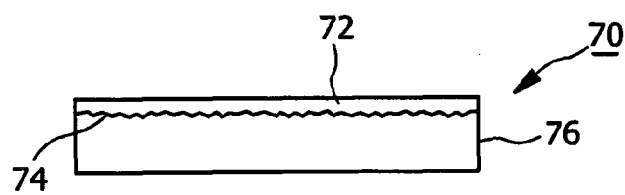
FIGS. 4-6 show schematic cross-sectional views of a fourth, fifth and sixth embodiment of a non-clonable optical identifier according to the present invention.
Figure 5:
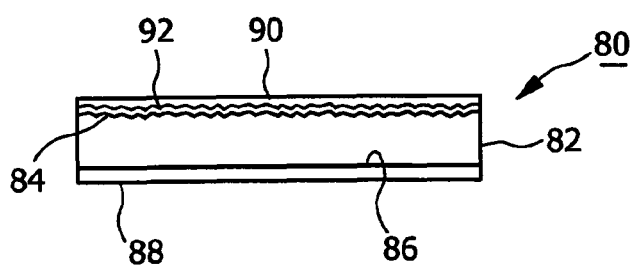
Figure 6:
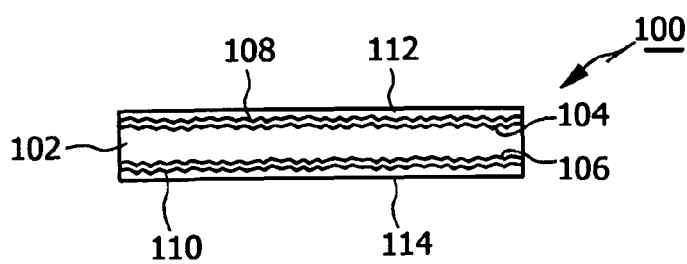

FIGS. 4-6 show schematic cross-sectional views of a fourth, fifth and sixth embodiment of a non-clonable optical identifier 70, 80, 100 according to the present invention.

The identifier 70 shown in FIG. 4 corresponds to the identifier 10 shown in FIG. 1, but is further provided with a protective layer 72 covering a scattering face 74 comprising a plurality of randomly oriented partial faces of a carrier layer 76. Said protective layer is scratch resistant, preferably highly scratch resistant and has a thickness of about 10 to 100 µm, as for example in a Blu-Ray disc. A protective layer 72 as used as a cover layer for credit cards may also be suitable.

FIG. 5 shows an identifier 80 similar to the identifier 30 shown in FIG. 2. The carrier layer 82 is provided with a scattering face 84 and a reflective face 86 due to a reflective coating 88 on a surface on the side of said carrier layer 82 opposite to said scattering face 84. Said identifier further comprises a protective layer 90 provided on the scattering face 84 being a surface of said carrier layer 82. Between said carrier layer 82 and said protective layer 90 a semi-transparent coating 92 is arranged as an Aluminum coating of about— for example—4 nm thickness having—for example—a reflectance of about 25% and a transmission of about 50%. Said semi-transparent coating 92 is adapted so that the power of the part of the radiation which is scattered at said scattering face 84, passes the carrier layer 82, is reflected at said reflective face 86, passes the carrier layer 82 again, is scattered again at scattering face 84 and exits the identifier 80 towards, for example, a camera. Said power is about equal to the power of the part of the radiation which is reflected by the scattering surface 84 and does not enter the carrier layer 82.

FIG. 6 shows another embodiment of a non-clonable optical identifier 100 according to the invention which is similar to that shown in FIG. 3. Said identifier 100 comprises a carrier layer 102 which comprises first and second scattering faces 104, 106 being opposite surfaces of said carrier layer 102. Said scattering surfaces 104, 106 are provided with semi-transparent coatings 108, 110 like the one described above with respect to FIG. 5. The identifier 100 is further provided with protective layers 112, 114 which are arranged on the side of said semi-transparent coatings 108, 110 opposite to said carrier layer 102.

Figure 7:
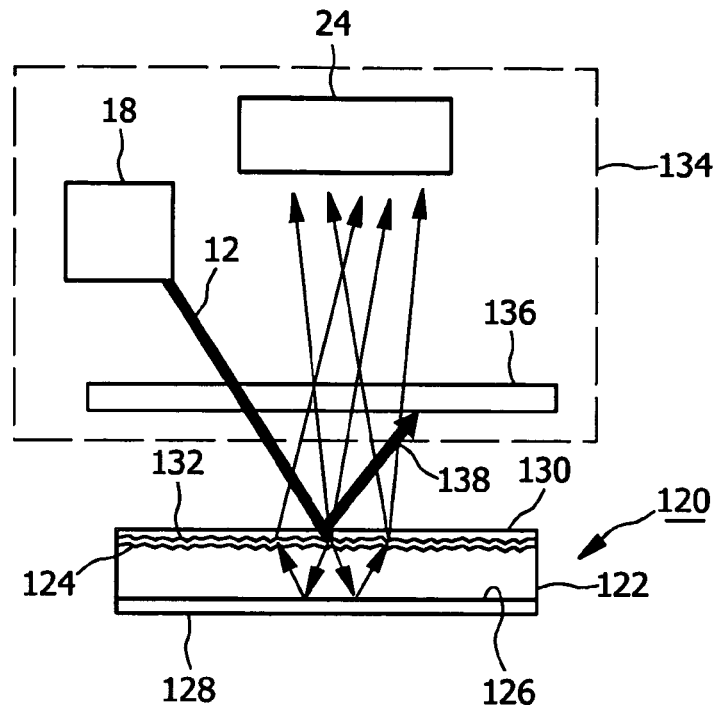
FIG. 7 shows a schematic cross-sectional view of a seventh embodiment of a non-clonable optical identifier according to the present invention being read by a reading apparatus according to the invention.

FIG. 7 shows a schematic cross-sectional view of a seventh embodiment of a non-clonable optical identifier 120 according to the present invention being read by a reading apparatus 134 according to the invention. Said identifier 120 being similar to the identifier 80 shown in FIG. 5 comprises a carrier layer 122. The carrier layer 122 is provided with a scattering face 124 and a reflective face 126 due to a reflective coating 128 on a surf-ace on the side of said carrier layer 122 opposite to said scattering face 124. Said identifier further comprises a protective layer 130 provided on the scattering face 124 being a surface of said carrier layer 122. Between said carrier layer 122 and said protective layer 130 a semi-transparent coating 132 is arranged. The protective layer 130 is made of a material which changes a polarization status of a radiation passing through it, in particular made of a material which is birefringent.

The reading apparatus 134 comprises a radiation source 18 for generating a radiation beam 12 and directing it to said optical identifier 120, a camera 24 for detecting an identification signal being generated by said optical identifier 120 in response to that radiation beam 12 and a circular polarizer arranged in the course of the radiation. Said radiation beam 12 impinges on said identifier 120. A part 138 of said radiation beam 12 is reflected by the outer surface of the protective layer 130 or by dirt on said surface. The circular polarization status of this part 138 is not changed since it does not enter said birefringent protective layer, except for its rotation direction due to the reflection against the front surface of layer 130. Thus it is blocked by said polarizer 136 and does not reach said camera 24 and therefore does not alter or disturb the detection of said identification signal. Only that part of the radiation beam 12 and the resulting partial beams which passes the protective layer 130 and is subjected to a change of its polarization status also partly passes the polarizer 136 and may be detected by said camera 24. Instead of only one polarizer a number of suitable corresponding polarizers may also be used, for example one in the path of the impinging radiation and one in the path of the scattered beam between the identifier and the detector.

The roughness $R_\alpha$ of the scattering face may be up to 100 µm, in particular ranges between 0.01 and 10 µm, preferably between 0.05 and 1 µm. The thickness values of the carrier layer, the protective layer and the coatings do not have to be uniform, and the carrier layer and the identifier may also be curved or bend.

Figure 8:
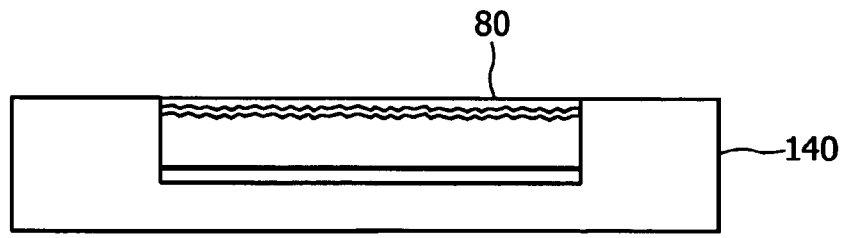
FIG. 8 shows a schematic cross-sectional view of a first embodiment of a device comprising a non-clonable optical identifier according to the present invention.

FIG. 8 shows a schematic cross-sectional view of a first embodiment of a device 140 comprising a non-clonable optical identifier 80 according to the present invention. Said optical identifier 80 is embedded into said device 140. The invention is not restricted to this kind of embedding, it is also possible to attach an optical identifier to said device in many other suitable ways.

Figure 9:
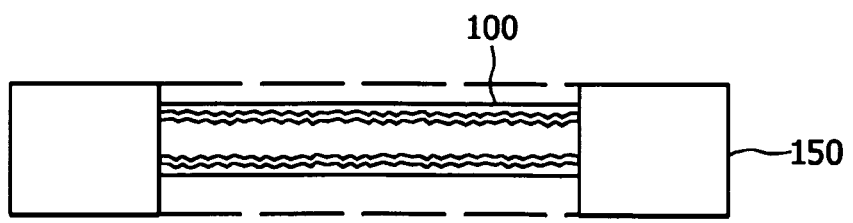
FIG. 9 shows a schematic cross-sectional view of a second embodiment of a device comprising a non-clonable optical identifier according to the present invention.

FIG. 9 shows a schematic cross-sectional view of a second embodiment of a device 150 comprising a non-clonable optical identifier 100 according to the present invention. Said optical identifier 100 is embedded into said device 150 in such a way it is possible for a radiation beam to pass said identifier 100 being scattered by said identifier 100 and also passes said device 150. The invention is not restricted to this kind of embedding, it is also possible to attach an optical identifier to said device in many other suitable ways.

FIGS. 10-12 show diagrams illustrating embodiments of a method for generating an identification signal according to the present invention.

FIG. 10 shows a first embodiment of a method for generating an identification signal. In step 160 a radiation beam impinging on a scattering face of a non-clonable optical identifier is scattered by said scattering face comprising a plurality of randomly oriented partial faces. At least a part of said radiation beam is transmitted through a carrier layer of said non-clonable optical identifier (step 162) and said identification signal is formed by combining at least a scattered part of said radiation beam (step 164).

A second embodiment of a method for generating an identification signal is shown in FIG. 11. In step 170 a radiation beam which is directed to a scattering face of a non-clonable optical identifier is scattered by said scattering face which comprises a plurality of randomly oriented partial faces. At least a part of said radiation beam is transmitted through a carrier layer of said non-clonable optical identifier (step 172) and reaches a reflective face of said identifier. A part of said radiation beam is reflected (step 174) and transmitted again through said carrier layer (step 176). Said identification signal is formed by combining at least a scattered part of said radiation beam (step 178).

In FIG. 12 another embodiment of a method for generating an identification signal is shown being similar to the method shown in FIG. 11. An incident radiation beam is scattered by a scattering face of an identifier (step 180), wherein a part of said beam is reflected at said scattering face (step 182) and another part is transmitted through a carrier layer of said identifier (step 184). Said transmitted part of said beam is at least partially reflected at a reflective face of said identifier (step 186) and transmitted again through said carrier layer (step 188). The identification signal is formed by combining said reflected parts of said beam (step 190).

It is possible to change the order of the steps as described above in some ways without changing the effect of the methods. For example, it is also possible to first transmit a radiation-beam through a carrier layer of an identifier and then scatter said radiation beam at a scattering face of said identifier.

A (non-clonable) optical identifier for generating an identification signal in response to an incident radiation beam, a device comprising the same, a reading apparatus for identifying the (non-clonable) optical identifier and a method for generating an identification signal in response to a radiation beam are thus herewith proposed. The identifier is easy to produce and exhibits sufficient or even improved durability against environmental influences like mechanical stress, thermal changes, dirt or other. The known techniques for producing such an identifier like the provision with scattering particles or fluid or air bubbles may be used in addition so that the carrier layer according to the invention further scatters the incident beam by itself. A device comprising the optical identifier according to the invention may be properly identified using the identification signal generated by the identifier. The reading apparatus according to the present invention is able to reliably identify the optical identifier regardless of possible scratches or other obstructions due to a soiled surface of the identifier. Further a method for generating an identification signal is provided which can easily be implemented in optical identifiers.

The invention claimed is:

1. Optical identifier for generating an identification signal in response to an incident radiation beam, said identifier comprising:
    a carrier layer at least partially transparent to said radiation beam,
    wherein said carrier layer is covered with a protective layer,
    wherein said carrier layer has a first scattering face comprising a plurality of randomly oriented partial faces for scattering at least a part of said radiation beam, said identification signal being formed by said part of said radiation beam scattered traversing said carrier layer,
    a reflective face for at least partially reflecting a part of said radiation beam scattered by said first scattering face to said first scattering face,
    wherein said carrier layer has a second scattering face, opposite said first scattering surface, said second scattering surface comprising a plurality of randomly oriented partial faces for scattering at least a part of said radiation beam,
    a semi-transparent coating at an interface between said carrier layer and said protective layer,
    wherein said semi-transparent coating is adapted for a part of said incident radiation beam being reflectively scattered by said first scattering face having an intensity substantially equal to the intensity of a part of said radiation beam which traverses said carrier layer, said radiation beam being reflected by said reflective face or said second scattering surface and traverses said carrier layer again.

2. Optical identifier as claimed in claim 1, wherein said carrier layer is substantially made of glass.

3. Optical identifier as claimed in claim 1, wherein said first scattering face, said reflective face and/or said second scattering face is a surface of said carrier layer.

4. Optical identifier as claimed in claim 1, said protective layer being adapted for changing a polarization status of said radiation beam, in particular being birefringent.

5. Device comprising an optical identifier as claimed in claim 1, said optical identifier substantially uniquely identifying said device.

6. Device as claimed in claim 5, wherein said device is a smartcard, a credit card, an ID card or a data carrier.

7. Method for using an optical identifier in a device to be authenticated by generating an identification signal in response to an impinging radiation beam, the method comprising the steps of:
    scattering said radiation beam by a scattering face of an optical identifier comprising: a plurality of randomly oriented partial faces, wherein at least a part of said radiation beam is transmitted through a carrier layer, wherein said carrier layer is covered with a protective layer, wherein said carrier layer has a first scattering face comprising a plurality of randomly oriented partial faces for scattering at least a part of said radiation beam, said identification signal being formed by said part of said radiation beam scattered traversing said carrier layer, a reflective face for at least partially reflecting a part of said radiation beam scattered by said first scattering face to said first scattering face, wherein said carrier layer has a second scattering surface, opposite said first scattering surface, said second scattering surface comprising a plurality of randomly oriented partial faces for scattering at least a part of said radiation beam, wherein a semi-transparent coating is situated at an interface between said carrier layer and said protective layer, wherein said semi-transparent coating is adapted for a part of said incident radiation beam being reflectively scattered by said first scattering face having an intensity substantially equal to the intensity of a part of said radiation beam which traverses said carrier layer, said radiation beam being reflected by said reflective face or said second scattering surface and traverses said carrier layer again,
    transmitting at least a part of said radiation beam through a carrier layer of said optical identifier,
    forming said identification signal by combining at least a scattered part of said radiation beam, and
    authenticating the device based on the formed identification signal.

8. Method as claimed in claim 7, further comprising the step of reflecting at least a part of said scattered part of said radiation beam.

9. Method as claimed in claim 8, further comprising the step of reflecting a part of said radiation beam at said scattering face, said identification signal being formed by combining said reflected parts of said radiation beam.

10. Reading apparatus for identifying an optical identifier for generating an identification signal in response to an incident radiation beam,
    said identifier comprising:
        a carrier layer at least partially transparent to said radiation beam, wherein said carrier layer has a first scattering face comprising a plurality of randomly oriented partial faces for scattering at least a part of said radiation beam,
        said identification signal being formed by said part of said scattered radiation beam traversing said carrier layer,
        said carrier layer being covered with a protective layer adapted for changing a polarization status of said radiation beam, said carrier layer having a first scattering face comprising a plurality of randomly oriented partial faces for scattering at least a part of said radiation beam, said identification signal being formed by said part of said radiation beam scattered traversing said carrier layer, said carrier layer having a reflective face for at least partially reflecting a part of said radiation beam scattered by said first scattering face to said first scattering face, said carrier layer having a second scattering surface, opposite said first scattering surface, said second scattering surface comprising a plurality of randomly oriented partial faces for scattering at least a part of said radiation beam, said optical identifier further comprising a semi-transparent coating at an interface between said carrier layer and said protective layer, wherein said semi-transparent coating is adapted for a part of said incident radiation beam being reflectively scattered by said first scattering face having an intensity substantially equal to the intensity of a part of said radiation beam which traverses said carrier layer, said radiation beam being reflected by said reflective face or said second scattering surface and traverses said carrier layer again, said reading apparatus comprising:
 a radiation source for generating said radiation beam,
 an imaging device for detecting said identification signal and
 a circular polarizer arranged in the course of said radiation beam and said identification signal.

11. The reading apparatus of claim 10 wherein the protective layer is birefringent thereby causing a change in polarization.

* * * * *